US011488395B2

(12) United States Patent
Kaku et al.

(10) Patent No.: US 11,488,395 B2
(45) Date of Patent: Nov. 1, 2022

(54) SYSTEMS AND METHODS FOR VEHICULAR NAVIGATION

(71) Applicant: Toyota Research Institute, Inc., Los Altos, CA (US)

(72) Inventors: Shunsho Kaku, Mountain View, CA (US); Ryan W. Wolcott, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 523 days.

(21) Appl. No.: 16/589,532

(22) Filed: Oct. 1, 2019

(65) Prior Publication Data

US 2021/0097309 A1    Apr. 1, 2021

(51) Int. Cl.
| | |
|---|---|
| *G06K 9/00* | (2022.01) |
| *G06V 20/56* | (2022.01) |
| *G05D 1/02* | (2020.01) |
| *G08G 1/16* | (2006.01) |
| *B60R 16/02* | (2006.01) |
| *B60W 30/12* | (2020.01) |
| *B60W 40/06* | (2012.01) |

(52) U.S. Cl.
CPC ............ *G06V 20/588* (2022.01); *B60R 16/02* (2013.01); *B60W 30/12* (2013.01); *B60W 40/06* (2013.01); *G05D 1/0276* (2013.01); *G08G 1/167* (2013.01)

(58) Field of Classification Search
None
See application file for complete search history.

(56) References Cited

U.S. PATENT DOCUMENTS

| | | | |
|---|---|---|---|
| 8,340,894 B2 | 12/2012 | Yester | |
| 10,000,188 B2 | 6/2018 | Bosscher et al. | |
| 2014/0088855 A1 | 3/2014 | Ferguson | |
| 2015/0106010 A1 | 4/2015 | Martin et al. | |
| 2016/0016663 A1 | 1/2016 | Stanek et al. | |
| 2021/0009365 A1* | 1/2021 | Ganesh | B65G 67/04 |
| 2021/0064902 A1* | 3/2021 | Connell | G06V 20/54 |

FOREIGN PATENT DOCUMENTS

WO    2018009190 A1    1/2018

OTHER PUBLICATIONS

Wang et al., "Random Fields in Vision Perception: A Survey", [Research Report] RR-7945, INRIA. 2012. hal-00734983 (Sep. 25, 2012).

* cited by examiner

*Primary Examiner* — Wei Wen Yang
(74) *Attorney, Agent, or Firm* — Christopher G. Darrow; Darrow Mustafa PC

(57) ABSTRACT

Systems and methods for vehicular navigation are disclosed herein. One embodiment receives, from one or more sensors, sensor data pertaining to a roadway section that is proximate to a vehicle; generates segmented sensor data to identify, in the roadway section, one or more boundary lines of one or more lanes; determines, from the sensor data, a direction of travel associated with at least one of the one or more lanes; applies a graphical model to the segmented sensor data to generate an output that includes a set of discrete points corresponding to the one or more boundary lines; generates an objective map of the roadway section from the set of discrete points; and uses the objective map to assist the vehicle in navigating the roadway section.

14 Claims, 5 Drawing Sheets

SYSTEMS AND METHODS FOR VEHICULAR NAVIGATION

TECHNICAL FIELD

The subject matter described herein generally relates to vehicles and, more particularly, to systems and methods for vehicular navigation.

BACKGROUND

Vehicle navigation systems sometimes encounter sections of roadway for which no prior high-definition map data is available. This can pose difficulties for manually driven vehicles, vehicles equipped with an advanced driver-assistance system (ADAS), and, in particular, autonomous vehicles.

SUMMARY

An example of a system for vehicular navigation is presented herein. The system comprises one or more sensors to output sensor data pertaining to a roadway section that is proximate to a vehicle, one or more processors, and a memory communicably coupled to the one or more processors. The memory stores a lane-segmentation module including instructions that when executed by the one or more processors cause the one or more processors to generate segmented sensor data from the sensor data to identify, in the roadway section, one or more boundary lines of one or more lanes. The lane-segmentation module also includes instructions to determine, from the sensor data, a direction of travel associated with at least one of the one or more lanes. The memory also stores a graphical-model module including instructions that when executed by the one or more processors cause the one or more processors to apply a graphical model to the segmented sensor data to generate an output that includes a set of discrete points corresponding to the one or more boundary lines. The memory also stores a lane-line partition module including instructions that when executed by the one or more processors cause the one or more processors to generate an objective map of the roadway section from the set of discrete points to assist the vehicle in navigating the roadway section.

Another embodiment is a non-transitory computer-readable medium for vehicular navigation and storing instructions that when executed by one or more processors cause the one or more processors to receive, from one or more sensors, sensor data pertaining to a roadway section that is proximate to a vehicle. The instructions also cause the one or more processors to generate segmented sensor data to identify, in the roadway section, one or more boundary lines of one or more lanes. The instructions also cause the one or more processors to determine, from the sensor data, a direction of travel associated with at least one of the one or more lanes. The instructions also cause the one or more processors to apply a graphical model to the segmented sensor data to generate an output that includes a set of discrete points corresponding to the one or more boundary lines. The instructions also cause the one or more processors to generate an objective map of the roadway section from the set of discrete points to assist the vehicle in navigating the roadway section.

In another embodiment, a method of roadway obstruction detection is disclosed. The method comprises receiving, from one or more sensors, sensor data pertaining to a roadway section that is proximate to a vehicle. The method also includes segmenting the sensor data to identify, in the roadway section, one or more boundary lines of one or more lanes, the segmenting producing segmented sensor data. The method also includes determining, from the sensor data, a direction of travel associated with at least one of the one or more lanes. The method also includes applying a graphical model to the segmented sensor data to generate an output that includes a set of discrete points corresponding to the one or more boundary lines. The method also includes generating an objective map of the roadway section from the set of discrete points. The method also includes using the objective map to assist the vehicle in navigating the roadway section.

BRIEF DESCRIPTION OF THE DRAWINGS

So that the manner in which the above-recited features of the present disclosure can be understood in detail, a more particular description of the disclosure, briefly summarized above, may be had by reference to the implementations, some of which are illustrated in the appended drawings. It is to be noted, however, that the appended drawings illustrate only possible implementations of this disclosure and are therefore not to be considered limiting of its scope. The disclosure may admit to other implementations.

To facilitate understanding, identical reference numerals have been used, wherever possible, to designate identical elements that are common to the figures. Additionally, elements of one or more embodiments may be advantageously adapted for utilization in other embodiments described herein.

DETAILED DESCRIPTION

When high-definition (HD) map data is unavailable for a roadway section, the embodiments described herein generate an objective map of the roadway section "on the fly" (in real time) to assist the vehicle in navigating the roadway section. As used herein, an "objective map" is one that is generated based exclusively on perceptual sensor data. Such sensor data can include, without limitation, image data (visible-light and/or infrared), Light Detection and Ranging (LIDAR) data, radar data, and sonar data. In one embodiment, a system for vehicular navigation generates segmented sensor data from the sensor data to identify, in the roadway section, one or more boundary lines of one or more lanes. This can be accomplished using, for example, instance segmentation of image data. The system can also apply various techniques to determine, from the sensor data, the direction of travel associated with one or more identified lanes.

In this embodiment, the system applies a graphical model (e.g., a Markov Random Field) to the segmented sensor data to generate an output that includes a set of discrete points corresponding to the one or more identified boundary lines.

A lane-line partitioning operation can connect the set of discrete points to generate an objective map of the roadway section that can be used to assist the vehicle in navigating the roadway section.

In some embodiments, the system obtains sensor data for the roadway section from one or more unmanned aerial vehicles (UAVs, aka "drones"). In other embodiments, the vehicle includes a mast that extends above the rooftop of the vehicle, and sensor data is obtained from sensors installed in or on the mast. In still other embodiments, the system obtains sensor data (e.g., travel-history traces) for the roadway section from one or more connected vehicles over a network.

In some embodiments, the system identifies one or more outer lane boundaries and projects such boundaries onto a two-dimensional representation of the roadway section. These outer lane boundaries can be an additional input to the graphical model. In some embodiments, the system performs semantic segmentation on the sensor data to identify features such as a lane marking, a curb, pixels associated with a lane, a vehicle head end, or a vehicle tail end. Such image-semantics data can also be input to the graphical model. In some embodiments, the system displays the objective map on a display device of the vehicle, permitting a human driver or other vehicle occupant to read and use the objective map in navigation. In other embodiments, the objective map can be used in conjunction with an advanced driver-assistance system (ADAS). In still other embodiments, the objective map can be used in connection with an autonomous driving mode of the vehicle.

Figure 1:
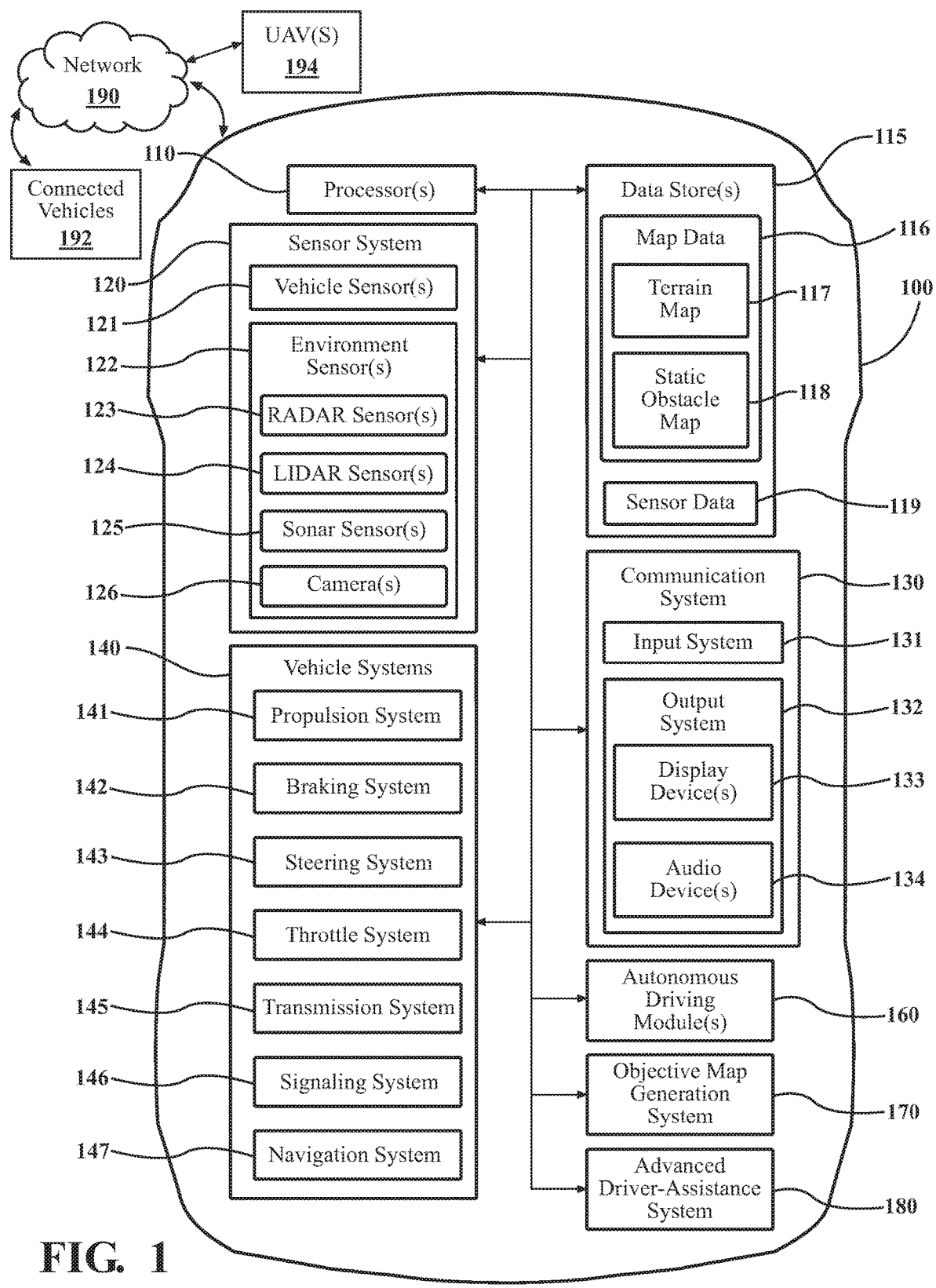
FIG. 1 illustrates one embodiment of a vehicle within which systems and methods disclosed herein may be implemented.

Referring to FIG. 1, an example of a vehicle 100, in which systems and methods disclosed herein can be implemented, is illustrated. The vehicle 100 can include an objective map generation system 170 or components and/or modules thereof. As used herein, a "vehicle" is any form of motorized transport. In one or more implementations, the vehicle 100 can be an automobile. In some implementations, the vehicle 100 may be any other form of motorized transport that, for example, can function manually under the control of an in-vehicle operator, semi-autonomously, or autonomously. The vehicle 100 can include the objective map generation system 170 or capabilities to support or interact with the objective map generation system 170 and thus benefits from the functionality discussed herein. While arrangements will be described herein with respect to automobiles, it will be understood that implementations are not limited to automobiles. Instead, implementations of the principles discussed herein can be applied to any kind of vehicle. Instances of vehicle 100, as used herein, are equally applicable to any device capable of incorporating the systems or methods described herein.

The vehicle 100 also includes various elements. It will be understood that, in various implementations, it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1, including objective map generation system 170. While the various elements are shown as being located within the vehicle 100 in FIG. 1, it will be understood that one or more of these elements can be located external to the vehicle 100. Further, the elements shown may be physically separated by large distances. As shown in FIG. 1, vehicle 100 may communicate with one or more connected vehicles 192 via network 190. Vehicle 100 may also communicate with one or more unmanned aerial vehicles (UAVs, aka "drones") via network 190. In the embodiment shown in FIG. 1, vehicle 100 also includes an advanced driver-assistance system (ADAS) 180.

Some of the possible elements of the vehicle 100 are shown in FIG. 1 and will be described in connection with subsequent figures. However, a description of many of the elements in FIG. 1 will be provided after the discussion of FIGS. 2-5 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those skilled in the art, however, will understand that the embodiments described herein may be practiced using various combinations of these elements.

Figure 2:
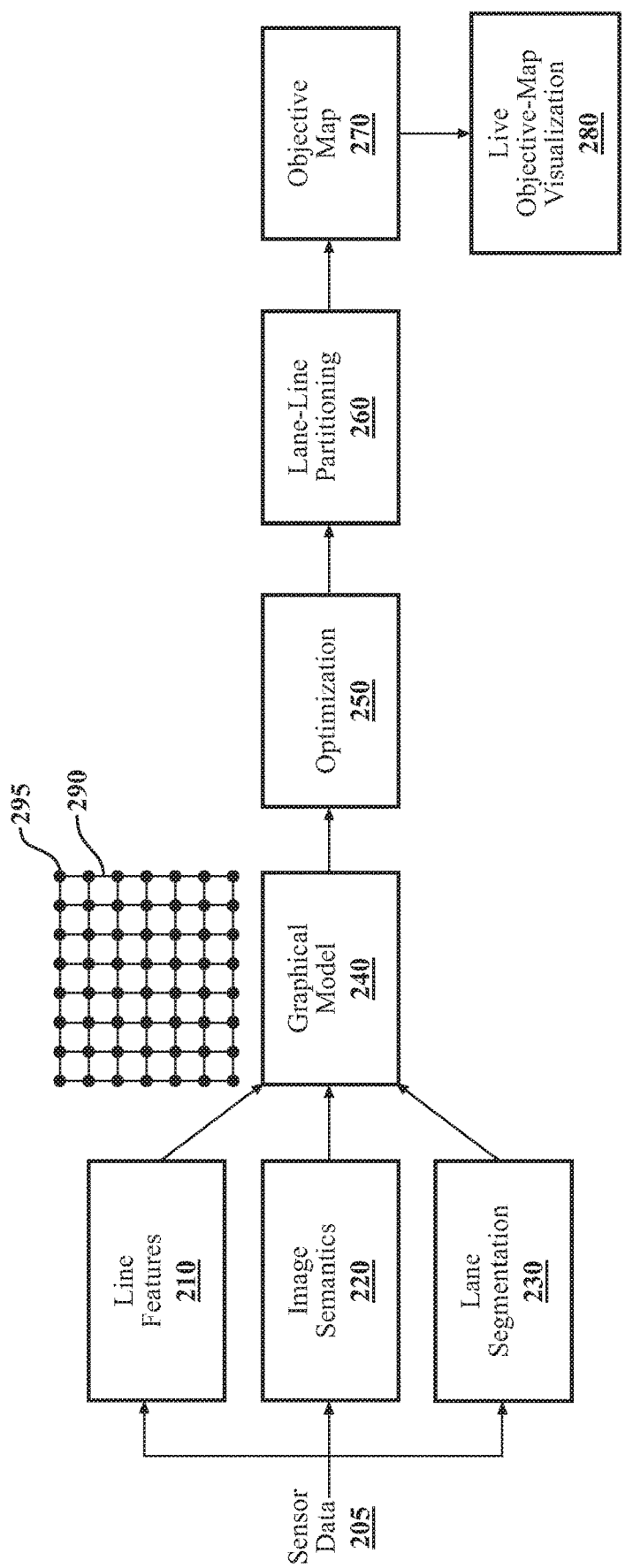
FIG. 2 is a diagram of the processing operations of an objective map generation system, in accordance with an illustrative embodiment of the invention.

FIG. 2 is a diagram of the processing operations of an objective map generation system 170, in accordance with an illustrative embodiment of the invention. FIG. 2 provides an overview of processing operations that will be discussed in greater detail below in connection with FIG. 3. In FIG. 2, sensor data 205 is input to line-features operation 210, image-semantics operation 220, and lane-segmentation operation 230. Line-features operation 210 identifies outer lane boundaries in sensor data 205 and projects those outer lane boundaries onto a two-dimensional representation of a roadway section. Image-semantics operation 220 identifies features such as a lane marking, a curb, pixels associated with a lane, a vehicle head end, and a vehicle tail end using techniques such as semantic segmentation. Lane-segmentation operation 230 identifies one or more boundary lines of one or more lanes in a roadway section using techniques such as instance segmentation.

The outputs of line-features operation 210, image-semantics operation 220, and lane-segmentation operation 230 are input to graphical model 240. One example of a graphical model 240 is a Markov Random Field (MRF). In other embodiments, a different type of graphical model can be employed. In FIG. 2, a grid 290 made up of discrete points 295 is shown above graphical model 240 to illustrate the nature of the graphical model 240. In some embodiments, optimization operation 250 can be used in conjunction with graphical model 240. In one embodiment, optimization operation 250 is a Block-Coordinate Descent Optimization process. Lane-line partitioning operation 260 connects the discrete points output from graphical model 240 and optimization operation 250 to generate an objective map 270 corresponding to the roadway section. In some embodiments, objective map 270 is presented to one or more vehicle occupants as a 3D rendering of the roadway section (live objective-map visualization operation 280).

Some embodiments do not include all of the operations indicated in FIG. 2. For example, in one embodiment, line-features operation 210, image-semantics operation 220, optimization operation 250, and live objective-map visualization operation 280 are omitted from the sequence of operations shown in FIG. 2.

Figure 3:
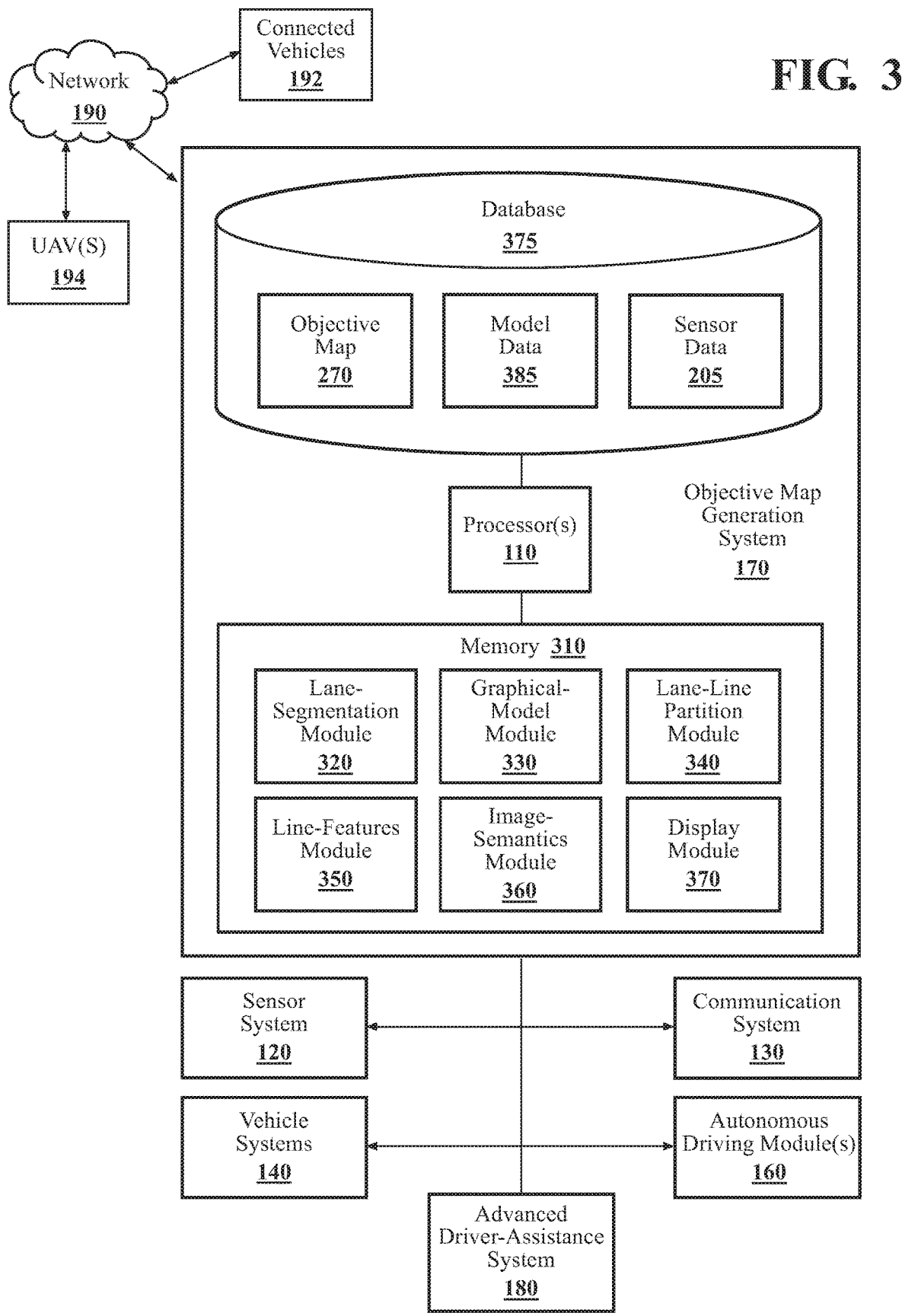
FIG. 3 illustrates an embodiment of an objective map generation system.

Referring to FIG. 3, one embodiment of the objective map generation system 170 of FIG. 1 is further illustrated. In this particular embodiment, objective map generation system 170 is shown as including one or more processors 110 from the vehicle 100 of FIG. 1. In general, the one or more processors 110 may be a part of objective map generation system 170, objective map generation system 170 may include one or more separate processors from the one or more processors 110 of the vehicle 100, or objective map generation system 170 may access the one or more processors 110 through a data bus or another communication path, depending on the embodiment.

In one embodiment, memory 310 stores a lane-segmentation module 320, a graphical-model module 330, a lane-line partition module 340, a line-features module 350, an image-semantics module 360, and a display module 370. The memory 310 is a random-access memory (RAM), read-only memory (ROM), a hard-disk drive, a flash memory, or other suitable memory for storing the modules 320, 330, 340, 350, 360, and 370. The modules 320, 330, 340, 350 360, and 370 are, for example, computer-readable instructions that when executed by the one or more processors 110, cause the one or more processors 110 to perform the various functions disclosed herein.

Objective map generation system 170, in various embodiments, receives environmental sensor data pertaining to a roadway section that is proximate to vehicle 100 from one or more of several sources. For example, a roadway section that is "proximate" to a vehicle can include a section of roadway extending several hundred feet ahead of vehicle 100. The sensor data 205 can include one or more of image, video, LIDAR, radar, and sonar data. The sensor data 205 can be stored, at least temporarily, in database 375. For example, in some embodiments, objective map generation system 170 receives sensor data 205 from sensor system 120 of vehicle 100. As shown in FIG. 2, in some embodiments, objective map generation system 170 can communicate with one or more connected vehicles 192 via network 190 to obtain sensor data 205 pertaining to a roadway section. In some embodiments, the sensor data 205 received from other vehicles can include travel-history trace data from the other vehicles pertaining to a roadway section. As also shown in FIG. 3, objective map generation system 170 can also communicate with UAV(s) 194 to obtain sensor data 205 pertaining to a roadway section. In one embodiment, vehicle 100 has one or more associated UAVs that can dock with vehicle 100 (e.g., on the roof or another location in or on vehicle 100) and take flight when needed (e.g., when HD map data for a road section ahead is unavailable) to provide sensor data 205 pertaining to a roadway section.

As shown in FIG. 3, objective map generation system 170 can also communicate with various vehicle systems 140, communication system 130, autonomous driving module(s) 160, and ADAS 180 (refer to FIG. 1).

Lane-segmentation module 320 generally includes instructions that cause the one or more processors 110 to generate segmented sensor data from the received sensor data to identify, in the roadway section, one or more boundary lines of one or more lanes in a roadway section. In one embodiment, lane-segmentation module 320 includes one or more deep neural networks (DNNs) to perform instance-level segmentation of identified features in image data. Examples of some of the object classes that can be identified in connection with lane segmentation are illustrated in FIG. 4.

Figure 4:
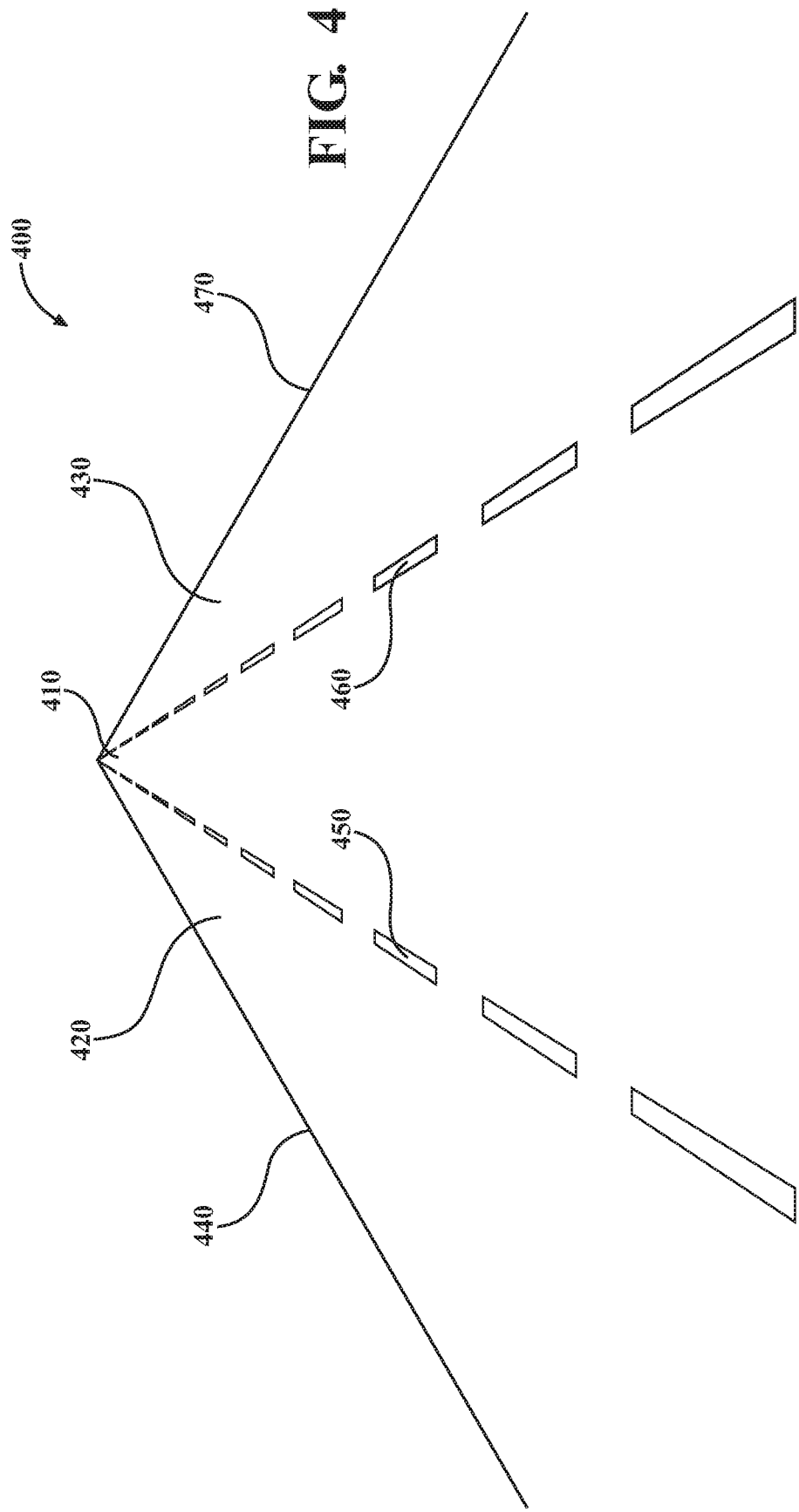
FIG. 4 illustrates a three-lane roadway section to which embodiments of the invention can be applied.

FIG. 4 illustrates a three-lane roadway section 400 proximate to vehicle 100 to which embodiments of the invention can be applied. FIG. 4 is a simplified perspective view of the roadway section 400 ahead of vehicle 100. In this example, there are three lanes in the same direction, and vehicle 100 is traveling in the center lane. For simplicity, lanes for traffic in the opposite direction are not shown in FIG. 4. Lane-segmentation module 320 generates segmented sensor data to identify ego-vehicle lane 410 (the lane in which vehicle 100 is traveling), left lane 420, and right lane 430. Additionally, lane-segmentation module 320 can identify left-lane line 440 of left lane 420, left-lane line 450 of ego-vehicle lane 410, right-lane line 460 of ego-vehicle lane 410, and right-lane line 470 of right lane 430. FIG. 4 is merely one example of a roadway section. Many other types of roadway sections are possible, including intersections, one-lane highways, two-lane highways, divided highways, roundabouts, etc.

In some embodiments, lane-segmentation module 320 can also identify additional object classes such as "lane-but-ignore" (lane regions other than the three lane types mentioned above that are not of interest to objective map generation system 170 under the circumstances) and "lane-line-but-ignore" (lane lines other than the four types mentioned above that are not of interest to objective map generation system 170 under the circumstances).

In some embodiments, lane-segmentation module 320 includes instructions that cause the one or more processors 110 to determine, from the sensor data, a direction of travel associated with at least one of the one or more identified lanes. In one embodiment, lane-segmentation module 320 includes one or more DNNs for determining lane directions. For example, the DNN can be trained with labeled training data, an example of supervised machine learning. In another embodiment, lane-segmentation module 320 determines the direction of travel associated with a lane by analyzing semantically segmented sensor data (e.g., image data) produced by image-semantics module 360 to identify a head end (front) of a vehicle or a tail end (rear) of a vehicle. Identifying the head end of another vehicle indicates that the lane carries traffic in the opposite direction of the ego vehicle (vehicle 100). Similarly, identifying the tail end of another vehicle indicates that the lane carries traffic in the same direction in which vehicle 100 is traveling. In yet another embodiment, lane-segmentation module 320 determines the direction of travel associated with a lane by tracking another vehicle's direction of movement over a sequence of video frames obtained from sensor system 120, one or more connected vehicles 192, UAV(s) 194, or a combination of those sources of sensor data 205.

Graphical-model module 330 generally includes instructions that cause the one or more processors 110 to apply a graphical model 240 to the segmented sensor data produced by lane-segmentation module 320 to generate an output that includes a set of discrete points corresponding to the one or more identified boundary lines of the one or more lanes. As mentioned above, in one embodiment, the graphical model is a Markov Random Field (MRF) with a grid topology, as illustrated in FIG. 2 (see grid 290 and discrete points 295). In other embodiments, a different variety of graphical model can be used. As discussed above in connection with FIG. 2, in some embodiments, an optimization process 250 can be used in conjunction with the graphical model 240. For example, a Block-Coordinate Descent Optimization process can be employed. One objective of the combined graphical model 240 and optimization operation 250 is to determine, given the input segmented sensor data, how the discrete points 295 in the grid 290 of the graphical model 240 should be displaced from their nominal positions so that the graphical model 240 outputs a set of discrete points that correspond statistically to the one or more boundary lines of the one or more lanes identified by lane-segmentation module 320.

Lane-line partition module 340 generally includes instructions that cause the one or more processors 110 to generate an objective map 270 of the roadway section from the set of discrete points output by graphical-model module 330 to assist the vehicle 100 in navigating the roadway section. As discussed above, this involves smoothly connecting the discrete points output by graphical-model module 330 to generate the objective map 270. The resulting objective map 270 can be stored in database 375 for use by navigation system 147, ADAS 180, autonomous driving module(s) 160, or a combination of those systems (see FIG. 1).

The resulting objective map 270 output by lane-line partition module 340 can be used in several different ways to assist vehicle 100 in navigating a roadway section. In one embodiment, the objective map 270 is displayed on a display device (e.g., display device(s) 133 in FIG. 1) of vehicle 100. This enables a human driver or other occupant of vehicle 100 to use the objective map 270 in connection with navigation. In some embodiments, the objective map 270 can be rendered on the display in a simulated 3D format (e.g., a perspective view of the road ahead based on the objective-map data). In another embodiment, objective map generation system 170 outputs the objective map 270 to ADAS 180. ADAS 180 can use the objective map 270 in deciding whether to intervene in a driver's maneuvers (e.g., changing lanes, speeding up relative to a lead vehicle, turning the wrong direction onto a one-way street, etc.). In yet another embodiment, objective map generation system 170 outputs the objective map 270 to navigation system 147 in connection with an autonomous driving mode of vehicle 100 that is controlled entirely or at least in part by autonomous driving module(s) 160. In such an embodiment, autonomous driving module(s) 160 can control the operation of one or more vehicle systems 140 of vehicle 100 (steering, acceleration, braking, etc.) in accordance with the objective map 270.

Some embodiments include line-features module 350. Line-features module 350 generally includes instructions that cause the one or more processors 110 to analyze the sensor data 205 to identify one or more outer lane boundaries and to project those one or more outer lane boundaries onto a two-dimensional (e.g., an aerial-view) representation of the roadway section. This corresponds to the line-features operation 210 discussed above in connection with FIG. 2. In one embodiment, line-features module 350 employs a simultaneous localization and mapping (SLAM) algorithm in identifying the outer lane boundaries and projecting them onto 2D space.

Some embodiments include image-semantics module 360. Image-semantics module 360 generally includes instructions that cause the one or more processors 110 to perform semantic segmentation on the sensor data 205 (e.g., image data) to identify features such as lane markings (e.g., markings painted on a lane, such as an arrow indicating a left turn lane or a symbol indicating a crosswalk or bicycle crossing), curbs, pixels associated with a lane, a vehicle head end, and a vehicle tail end. In one embodiment, image-semantics module 360 includes one or more DNNs to perform semantic segmentation. As discussed above, lane-segmentation module 320, in some embodiments, analyzes semantically segmented sensor data, specifically identified other-vehicle head ends and tail ends, to determine the direction of travel associated with one or more lanes in the roadway section.

Some embodiments include display module 370. Display module 370 generally includes instructions that cause the one or more processors 110 to display an objective map 270 on a display device of vehicle 100 (e.g., on display device(s) 133). As discussed above, in some embodiments, objective map 270 can be rendered in a simulated 3D format (see live objective-map visualization operation 280 above in connection with FIG. 2). In some embodiments, this 3D representation is updated in real time as vehicle 100 travels along a roadway.

Figure 5:
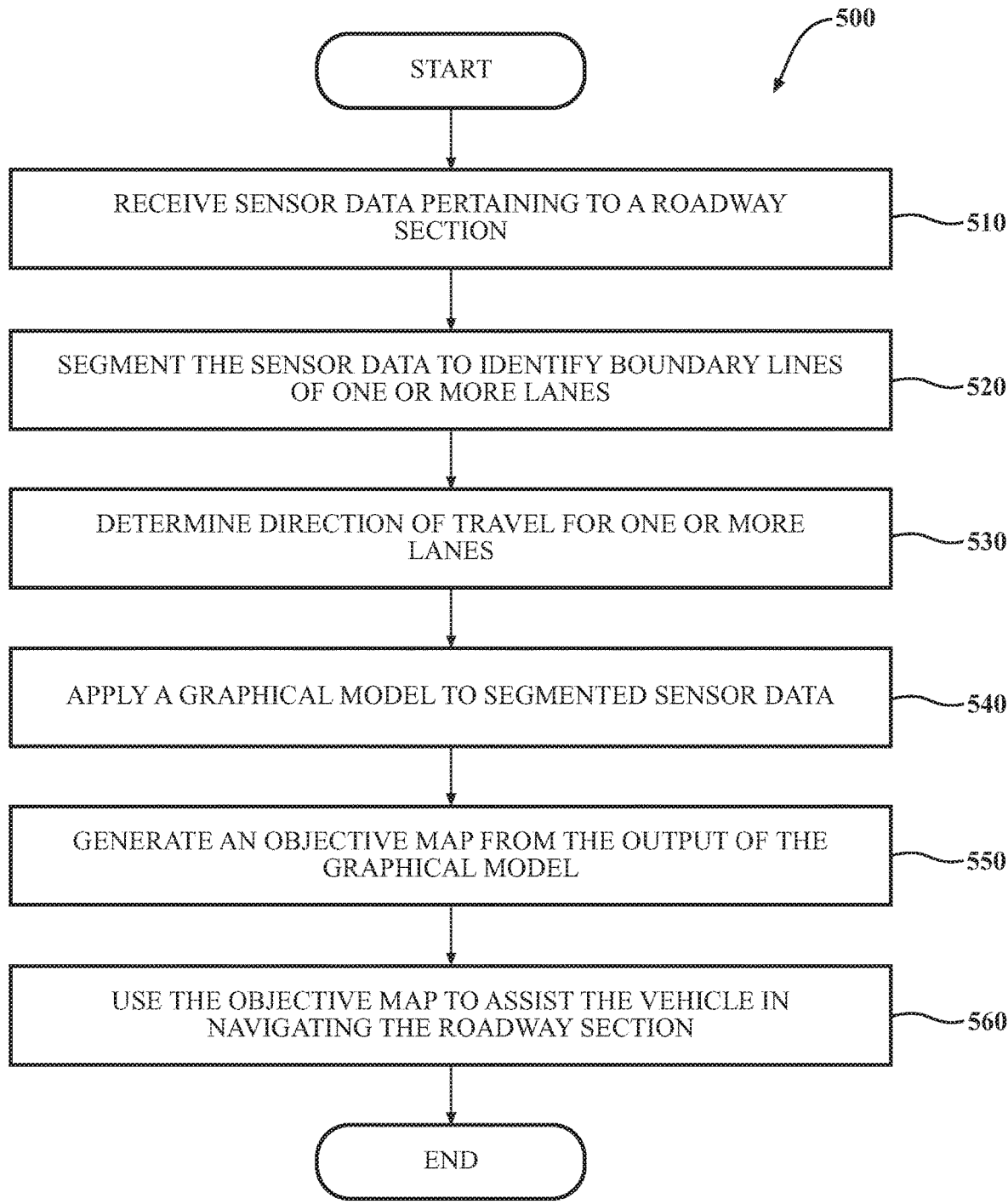
FIG. 5 is a flowchart of a method of vehicular navigation, in accordance with an illustrative embodiment of the invention.

FIG. 5 is a flowchart of a method 500 of vehicular navigation, in accordance with an illustrative embodiment of the invention. Method 500 will be discussed from the perspective of objective map generation system 170 in FIG. 3. While method 500 is discussed in combination with objective map generation system 170, it should be appreciated that method 500 is not limited to being implemented within objective map generation system 170, but objective map generation system 170 is instead one example of a system that may implement method 500.

At block 510, objective map generation system 170 receives, from one or more sensors, sensor data 205 pertaining to a roadway section that is proximate to vehicle 100. As discussed above, such data can include one or more of image, video, LIDAR, radar, and sonar data. The sensor data 205 can be received from sensor system 120, one or more connected vehicles 192, UAV(s) 194, or a combination of these sources.

At block 520, lane-segmentation module 320 generates segmented sensor data from the sensor data to identify, in the roadway section, one or more boundary lines of one or more lanes. As discussed above, this can include the use of one or more DNNs to perform instance-level segmentation of the sensor data 205.

At block 530, lane-segmentation module 320 determines, from the sensor data 205, a direction of travel associated with at least one of the one or more identified lanes. As discussed above, this can be accomplished through the use of one or more DNNs, analyzing semantically segmented sensor data to identify at least one of an other-vehicle head end and an other-vehicle tail end, tracking another vehicle's direction of movement over a sequence of video frames, or a combination of these techniques.

At block 540, graphical-model module 330 applies a graphical model 240 to the segmented sensor data to generate an output that includes a set of discrete points corresponding to the one or more identified boundary lines of the one or more identified lanes. As discussed above, in some embodiments, the graphical model 240 is a MRF. Also, in some embodiments, an optimization process is combined with graphical model 240 (e.g., a Block-Coordinate Descent Optimization process).

At block 550, lane-line partition module 340 generates an objective map 270 from the set of discrete points output by graphical-model module 330. As discussed above, this process includes connecting the set of discrete points with smooth lines. The resulting objective map 270 can be stored in database 375 for use by other vehicle systems, such as navigation system 147.

At block 560, objective map generation system 170 uses the objective map 270 to assist vehicle 100 in navigating the corresponding roadway section. As discussed above, one way to use the objective map 270 to assist navigation is to display it (e.g., in 3D perspective format) on a display device (e.g., display device(s) 133 in FIG. 1) of vehicle 100 (see display module 370 in FIG. 3). In another embodiment, objective map generation system 170 outputs the objective map 270 to ADAS 180. ADAS 180 can use the objective map 270 in deciding whether to intervene in a driver's maneuvers in an assisted-driving mode of vehicle 100. In yet another embodiment, objective map generation system 170 outputs the objective map 270 to navigation system 147 in connection with an autonomous driving mode of vehicle 100 that is controlled entirely or at least in part by autonomous driving module(s) 160. In such an embodiment, autonomous driving module(s) 160 can control the operation of one or more vehicle systems 140 of vehicle 100 (steering, acceleration, braking, etc.) in accordance with the objective map 270.

In some embodiments, method 500 includes analyzing the sensor data to identify one or more outer lane boundaries and to project the one or more outer lane boundaries onto a 2D representation of the roadway section. This is discussed above in connection with line-features module 350 in FIG. 3. Also, in some embodiments, method 500 includes performing semantic segmentation on the sensor data to identify one or more of a lane marking, a curb, one or more pixels associated with a lane, a vehicle head end, and a vehicle tail end. This is discussed above in connection with image-semantics module 360 in FIG. 3.

As discussed above, in various embodiments, a variety of different kinds of sensor data, communication-related data, and logged data are input to a graphical model and optimized together to generate a live objective map for navigation (autonomous driving or semi-autonomous driving with the assistance of an ADAS or super ADAS). One advantage of the embodiments described herein is that the objective map generation system 170 can still operate successfully even if some categories of input data discussed above are unavailable.

Depending on the particular embodiment, objective map generation system 170 can acquire or update the various categories of input data at different frequencies. For example, in one embodiment, the following types of data are updated at an interval of 100 ms or less: segmented sensor data (DNN-based instance-segmented sensor data produced by lane-segmentation module 320), semantically segmented sensor data produced by image-semantics module 360, temporal information such as system timestamps, and travel-history trace data from surrounding vehicles. In this embodiment, the following types of data are updated at an interval of 24 hours or less: lane-line features data produced by line-features module 350 and the ego vehicle's own trace data. These latter categories of data can, in some embodiments, be optimized for use during the next day's travel while the vehicle is parked overnight. In some embodiments, this process can be scaled through use of a cloud service and/or vehicle-to-vehicle (V2V) communication with other vehicles in the vicinity. In one embodiment, map data 116 is updated at an interval of from once every two months to once a year.

FIG. 1 will now be discussed in full detail as an example vehicle environment within which the systems and methods disclosed herein may be implemented. In some instances, the vehicle 100 can be configured to switch selectively between an autonomous mode, one or more semi-autonomous operational modes, and/or a manual mode. Such switching, also referred to as handover when transitioning to a manual mode, can be implemented in a suitable manner, now known or later developed. "Manual mode" means that all of or a majority of the navigation and/or maneuvering of the vehicle is performed according to inputs received from a user (e.g., human driver/operator).

In one or more implementations, the vehicle 100 can be an autonomous vehicle. As used herein, "autonomous vehicle" refers to a vehicle that operates in an autonomous mode. "Autonomous mode" refers to navigating and/or maneuvering a vehicle along a travel route using one or more computing devices to control the vehicle with minimal or no input from a human driver/operator. In one implementation, the vehicle 100 is configured with one or more semi-autonomous operational modes in which one or more computing devices perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more implementations, the vehicle 100 operates autonomously according to a particular defined level of autonomy.

The vehicle 100 can include one or more processors 110. In one or more arrangements, the one or more processors 110 can be a main processor of the vehicle 100. For instance, the one or more processors 110 can be an electronic control unit (ECU). The vehicle 100 can include one or more data stores 115 for storing one or more types of data. The data store(s) 115 can include volatile and/or non-volatile memory. Examples of suitable data stores 115 include RAM, flash memory, ROM, PROM (Programmable Read-Only Memory), EPROM, EEPROM (Electrically Erasable Programmable Read-Only Memory), registers, magnetic disks, optical disks, hard drives, or any other suitable storage medium, or any combination thereof. The data store(s) 115 can be a component(s) of the one or more processors 110, or the data store(s) 115 can be operatively connected to the one or more processors 110 for use thereby. The term "operatively connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. In one or more arrangement, the map data 116 can include one or more terrain maps 117. The terrain map(s) 117 can include information about the ground, terrain, roads, surfaces, and/or other features of one or more geographic areas. In one or more arrangement, the map data 116 can include one or more static obstacle maps 118. The static obstacle map(s) 118 can include information about one or more static obstacles located within one or more geographic areas.

The one or more data stores 115 can include sensor data 119. In this context, "sensor data" means any information about the sensors that a vehicle is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operatively connected to the one or more processors 110, the data store(s) 115, and/or another element of the vehicle 100 (including any of the elements shown in FIG. 1).

The sensor system 120 can include any suitable type of sensor. Various examples of different types of sensors will be described herein. However, it will be understood that the implementations are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and/or orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes any data or information about the external environment in which a vehicle is located or one or more portions thereof. For example, the one or more environment sensors 122 can be configured to detect, quantify, and/or sense obstacles in at least a portion of the external environment of the vehicle 100 and/or information/data about such obstacles. The one or more environment sensors 122 can be configured to detect, measure, quantify, and/or sense other things in at least a portion the external environment of the vehicle 100, such as, for example, nearby vehicles, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the implementations are not limited to the particular sensors described. As an example, in one or more arrangements, the sensor system 120 can include one or more radar sensors 123, one or more LIDAR sensors 124, one or more sonar sensors 125, and/or one or more cameras 126.

The vehicle 100 can further include a communication system 130. The communication system 130 can include one or more components configured to facilitate communication between the vehicle 100 and one or more communication sources. Communication sources, as used herein, refers to people or devices with which the vehicle 100 can communicate with, such as external networks, computing devices, operator or occupants of the vehicle 100, or others. As part of the communication system 130, the vehicle 100 can include an input system 131. An "input system" includes any device, component, system, element or arrangement or groups thereof that enable information/data to be entered into a machine. In one or more examples, the input system 131 can receive an input from a vehicle occupant (e.g., a driver or a passenger). The vehicle 100 can include an output system 132. An "output system" includes any device, component, or arrangement or groups thereof that enable information/data to be presented to the one or more communication sources (e.g., a person, a vehicle passenger, etc.). The communication system 130 can further include specific elements which are part of or can interact with the input system 131 or the output system 132, such as one or more display device(s) 133, and one or more audio device(s) 134 (e.g., speakers and microphones).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combinations thereof, now known or later developed.

The one or more processors 110, and/or the autonomous driving module(s) 160 can be operatively connected to communicate with the various vehicle systems 140 and/or individual components thereof. For example, returning to FIG. 1, the one or more processors 110 and/or the autonomous driving module(s) 160 can be in communication to send and/or receive information from the various vehicle systems 140 to control the movement, speed, maneuvering, heading, direction, etc. of the vehicle 100. The one or more processors 110, the objective map generation system 170, and/or the autonomous driving module(s) 160 may control some or all of these vehicle systems 140 and, thus, may be partially or fully autonomous.

The vehicle 100 can include one or more modules, at least some of which are described herein. The modules can be implemented as computer-readable program code that, when executed by a processor 110, implement one or more of the various processes described herein. The processor 110 can be a device, such as a CPU, which is capable of receiving and executing one or more threads of instructions for the purpose of performing a task. One or more of the modules can be a component of the one or more processors 110, or one or more of the modules can be executed on and/or distributed among other processing systems to which the one or more processors 110 is operatively connected. The modules can include instructions (e.g., program logic) executable by the one or more processors 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

In some implementations, the vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s)

160 can use such data to generate one or more driving scene models. The autonomous driving module(s) 160 can determine the position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 either independently or in combination with the objective map generation system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g., one or more of vehicle systems 140). The noted functions and methods will become more apparent with a further discussion of the figures.

Detailed implementations are disclosed herein. However, it is to be understood that the disclosed implementations are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various implementations are shown in FIGS. 1-5, but the implementations are not limited to the illustrated structure or application.

The flowcharts and block diagrams in the figures illustrate the architecture, functionality, and operation of possible implementations of systems, methods, and computer program products according to various implementations. In this regard, each block in the flowcharts or block diagrams can represent a module, segment, or portion of code, which comprises one or more executable instructions for implementing the specified logical function(s). It should also be noted that, in some alternative implementations, the functions noted in the block can occur out of the order noted in the figures. For example, two blocks shown in succession can be executed substantially concurrently, or the blocks can sometimes be executed in the reverse order, depending upon the functionality involved.

The systems, components and/or methods described above can be realized in hardware or a combination of hardware and software and can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with computer-usable program code that, when being loaded and executed, controls the processing system such that it carries out the methods described herein. The systems, components and/or methods also can be embedded in a computer-readable storage, such as a computer program product or other data programs storage device, readable by a machine, tangibly embodying a program of instructions executable by the machine to perform methods and methods described herein. These elements also can be embedded in an application product which comprises all the features enabling the implementation of the methods described herein and, which when loaded in a processing system, is able to carry out these methods.

Furthermore, arrangements described herein can take the form of a computer program product embodied in one or more computer-readable media having computer-readable program code embodied or embedded, such as stored thereon. Any combination of one or more computer-readable media can be utilized. The computer-readable medium can be a computer-readable signal medium or a computer-readable storage medium. The phrase "computer-readable storage medium" means a non-transitory storage medium. A computer-readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a RAM, a ROM, an EPROM or Flash memory, an optical fiber, a portable compact disc read-only memory (CD-ROM), a digital versatile disc (DVD), an optical storage device, a magnetic storage device, or any suitable combination of the foregoing. In the context of this document, a computer-readable storage medium can be any tangible medium that can contain, or store a program for use by, or in connection with, an instruction execution system, apparatus, or device.

Program code embodied on a computer-readable medium can be transmitted using any appropriate medium, including but not limited to wireless, wireline, optical fiber, cable, RF, etc., or any suitable combination of the foregoing. Computer program code for carrying out operations for aspects of the present arrangements can be written in any combination of one or more programming languages, including an object-oriented programming language such as Java™, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer, or entirely on the remote computer or server. In the latter scenario, the remote computer can be connected to the user's computer through any type of network, including a LAN or a WAN, or the connection can be made to an external computer (for example, through the Internet using an Internet Service Provider).

In the description above, certain specific details are outlined in order to provide a thorough understanding of various implementations. However, one skilled in the art will understand that the invention may be practiced without these details. In other instances, well-known structures have not been shown or described in detail to avoid unnecessarily obscuring descriptions of the implementations. Unless the context requires otherwise, throughout the specification and claims which follow, the word "comprise" and variations thereof, such as, "comprises" and "comprising" are to be construed in an open, inclusive sense, that is, as "including, but not limited to." Further, headings provided herein are for convenience only and do not interpret the scope or meaning of the claimed invention.

Reference throughout this specification to "one or more implementations" or "an implementation" means that a particular feature, structure or characteristic described in connection with the implementation is included in at least one or more implementations. Thus, the appearances of the phrases "in one or more implementations" or "in an implementation" in various places throughout this specification are not necessarily all referring to the same implementation. Furthermore, the particular features, structures, or characteristics may be combined in any suitable manner in one or more implementations. Also, as used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings (such as "Background" and "Summary") and sub-headings used herein are intended only for general organization of topics within the present disclosure and are not intended to limit the disclosure of the technology or any aspect thereof. The recitation of multiple implementations having stated features is not intended to exclude other implementations having additional features, or other implementations incorporating different combinations of the stated features. As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an implementation can or may comprise certain elements or features does not exclude other implementations of the present technology that do not contain those elements or features.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an implementation or particular system is included in at least one or more implementations or aspect. The appearances of the phrase "in one aspect" (or variations thereof) are not necessarily referring to the same aspect or implementation. It should also be understood that the various method steps discussed herein do not have to be carried out in the same order as depicted, and not each method step is required in each aspect or implementation.

Generally, "module," as used herein, includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

The terms "a" and "an," as used herein, are defined as one as or more than one. The term "plurality," as used herein, is defined as two or more than two. The term "another," as used herein, is defined as at least a second or more. The terms "including" and/or "having," as used herein, are defined as including (i.e., open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g., AB, AC, BC or ABC).

The preceding description of the implementations has been provided for purposes of illustration and description. It is not intended to be exhaustive or to limit the disclosure. Individual elements or features of a particular implementation are generally not limited to that particular implementation, but, where applicable, are interchangeable and can be used in a selected implementation, even if not specifically shown or described. The same may also be varied in many ways. Such variations should not be regarded as a departure from the disclosure, and all such modifications are intended to be included within the scope of the disclosure.

While the preceding is directed to implementations of the disclosed devices, systems, and methods, other and further implementations of the disclosed devices, systems, and methods can be devised without departing from the basic scope thereof. The scope thereof is determined by the claims that follow.

What is claimed is:

1. A system for vehicular navigation, the system comprising:
   one or more sensors to output sensor data pertaining to a roadway section that is proximate to a vehicle;
   one or more processors; and
   a memory communicably coupled to the one or more processors and storing:
      a lane-segmentation module including instructions that when executed by the one or more processors cause the one or more processors to:
         generate segmented sensor data from the sensor data to identify, in the roadway section, one or more boundary lines of one or more lanes; and
         determine, from the sensor data, a direction of travel associated with at least one of the one or more lanes other than a lane in which the vehicle is traveling by doing one of (a) processing the sensor data using a deep neural network, (b) identifying, among semantically segmented sensor data, at least one of a head end and a tail end of another vehicle, and (c) tracking another vehicle's direction of movement over a sequence of video frames;
      a graphical-model module including instructions that when executed by the one or more processors cause the one or more processors to apply a graphical model to the segmented sensor data to generate an output that includes a set of discrete points corresponding to the one or more boundary lines; and
      a lane-line partition module including instructions that when executed by the one or more processors cause the one or more processors to generate, from the set of discrete points, an objective map of the roadway section that includes the direction of travel to assist the vehicle in navigating the roadway section.

2. The system of claim 1, wherein the objective map is generated exclusively from the sensor data without reliance on prior high-definition map data for the roadway section.

3. The system of claim 1, wherein the one or more sensors are located in one or more of a chassis of the vehicle, a mast of the vehicle that extends above a rooftop of the vehicle, an unmanned aerial vehicle in communication with the vehicle, and one or more other vehicles in communication with the vehicle, the sensor data from the one or more other vehicles including travel-history traces from the one or more other vehicles.

4. The system of claim 1, wherein the graphical model is a Markov Random Field.

5. The system of claim 4, wherein the graphical-model module includes instructions to supplement the Markov Random Field with a Block-Coordinate Descent Optimization process.

6. The system of claim 1, further comprising:
a line-features module including instructions that when executed by the one or more processors cause the one or more processors to analyze the sensor data to identify one or more outer lane boundaries and to project the one or more outer lane boundaries onto a two-dimensional representation of the roadway section.

7. The system of claim 1, further comprising:
an image-semantics module including instructions that when executed by the one or more processors cause the one or more processors to perform semantic segmentation on the sensor data to identify one or more of a lane marking, a curb, one or more pixels associated with a lane, a vehicle head end, and a vehicle tail end.

8. The system of claim 1, wherein the one or more lanes include at least one of an ego-vehicle lane, a left lane, and a right lane and the one or more boundary lines include at least one of a left-lane line of an ego-vehicle lane, a right-lane line of an ego-vehicle lane, a left-lane line of a left lane, and a right-lane line of a right lane.

9. The system of claim 1, further comprising:
a display module including instructions that when executed by the one or more processors cause the one or more processors to display the objective map on a display device of the vehicle.

10. A non-transitory computer-readable medium for vehicular navigation and storing instructions that when executed by one or more processors cause the one or more processors to:
receive, from one or more sensors, sensor data pertaining to a roadway section that is proximate to a vehicle;
generate segmented sensor data to identify, in the roadway section, one or more boundary lines of one or more lanes;
determine, from the sensor data, a direction of travel associated with at least one of the one or more lanes other than a lane in which the vehicle is traveling by doing one of (a) processing the sensor data using a deep neural network, (b) identifying, among semantically segmented sensor data, at least one of a head end and a tail end of another vehicle, and (c) tracking another vehicle's direction of movement over a sequence of video frames;
apply a graphical model to the segmented sensor data to generate an output that includes a set of discrete points corresponding to the one or more boundary lines; and
generate, from the set of discrete points, an objective map of the roadway section that includes the direction of travel to assist the vehicle in navigating the roadway section.

11. A method of vehicular navigation, the method comprising:
receiving, from one or more sensors, sensor data pertaining to a roadway section that is proximate to a vehicle;
segmenting the sensor data to identify, in the roadway section, one or more boundary lines of one or more lanes, the segmenting producing segmented sensor data;
determining, from the sensor data, a direction of travel associated with at least one of the one or more lanes other than a lane in which the vehicle is traveling by doing one of (a) processing the sensor data using a deep neural network, (b) identifying, among semantically segmented sensor data, at least one of a head end and a tail end of another vehicle, and (c) tracking another vehicle's direction of movement over a sequence of video frames;
applying a graphical model to the segmented sensor data to generate an output that includes a set of discrete points corresponding to the one or more boundary lines;
generating, from the set of discrete points, an objective map of the roadway section that includes the direction of travel; and
using the objective map to assist the vehicle in navigating the roadway section.

12. The method of claim 11, wherein using the objective map to assist the vehicle in navigating the roadway section includes displaying the objective map on a display device of the vehicle.

13. The method of claim 11, wherein using the objective map to assist the vehicle in navigating the roadway section includes outputting the objective map to an advanced driver-assistance system (ADAS).

14. The method of claim 11, wherein using the objective map to assist the vehicle in navigating the roadway section includes controlling navigation of the vehicle in accordance with the objective map while the vehicle is operating in an autonomous driving mode.

* * * * *